US012578876B2

(12) United States Patent
Hua et al.

(10) Patent No.: US 12,578,876 B2
(45) Date of Patent: Mar. 17, 2026

(54) INTERLEAVING RAID SLICES ALLOCATION FOR FAST REBUILD

(71) Applicant: Dell Products L.P., Hopkinton, MA (US)

(72) Inventors: Kuolin Hua, Natick, MA (US); Kunxiu Gao, Boxborough, MA (US); Jiahui Wang, Southborough, MA (US)

(73) Assignee: Dell Products L.P., Hopkinton, MA (US)

( * ) Notice: Subject to any disclaimer, the term of this patent is extended or adjusted under 35 U.S.C. 154(b) by 124 days.

(21) Appl. No.: 18/793,994

(22) Filed: Aug. 5, 2024

(65) Prior Publication Data

US 2026/0037146 A1 Feb. 5, 2026

(51) Int. Cl.
*G06F 3/00* (2006.01)
*G06F 3/06* (2006.01)

(52) U.S. Cl.
CPC .......... *G06F 3/0619* (2013.01); *G06F 3/0629* (2013.01); *G06F 3/0689* (2013.01)

(58) Field of Classification Search
None
See application file for complete search history.

(56) References Cited

U.S. PATENT DOCUMENTS 9,489,260 B1 * 11/2016 Hong ...................... G06F 3/064
2017/0322844 A1 * 11/2017 Hong ................ G11B 20/1833

* cited by examiner

*Primary Examiner* — Midys Rojas
(74) *Attorney, Agent, or Firm* — Anderson Gorecki LLP

(57) ABSTRACT

Data protection super-slices with super-parity $\underline{p}$ are created from sets of two RAID slices a, b of width $\overline{W}$ that each include slice parity $\underline{a}$, $\underline{b}$. The tracks of each super-slice are distributed across the disks of a disk cluster of width $2W+1$, and the same number of indexed sequences. Each of the indexed sequences contains one super-slice with the slice tracks a, b distributed according to a fixed sequence in order from a start pointer to a stop pointer. The start pointer and the stop pointer are shifted one place for each successive indexed sequence. The fixed sequence may be characterized by slice track adjacency or be interleaved, e.g., (a b b a a a a a b b b b a b b b a a b a b b a a $\underline{b}$ $\underline{a}$ p) or ($\underline{a}$ a b a b b a b b b b a a a b a a a b a a a b b b $\underline{b}$ $\underline{p}$).

20 Claims, 9 Drawing Sheets

RAID Slice a1

Storage Resource Pool 205

Production Storage Object 240

Super-slice with Slice Track Adjacency

Figure 4

| disk | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| sequential read count | 7 | 5 | 3 | 1 | 1 | 3 | 5 | 7 | 9 | 11 | 13 | 15 | 17 | 19 | 21 | 23 | 24 | | 24 | 23 | 21 | 19 | 17 | 15 | 13 | 11 | 9 |
| read % | 26 | 19 | 11 | 4 | 4 | 11 | 19 | 26 | 33 | 41 | 48 | 56 | 63 | 70 | 78 | 85 | 89 | | 89 | 85 | 78 | 70 | 63 | 56 | 48 | 41 | 33 |
| interleave read count | 13 | 14 | 14 | 13 | 13 | 14 | 14 | 13 | 11 | 10 | 15 | 12 | 14 | 13 | 14 | 13 | 12 | | 12 | 13 | 14 | 13 | 14 | 12 | 15 | 10 | 11 |
| read % | 48 | 52 | 52 | 48 | 48 | 52 | 52 | 48 | 41 | 37 | 56 | 44 | 52 | 48 | 52 | 48 | 44 | | 44 | 48 | 52 | 48 | 52 | 44 | 56 | 37 | 41 |

Figure 5

| seq\disk | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| 1 | a1 | a1 | a1 | a1 | b1 | a1 | b1 | a1 | a1 | b1 | b1 | b1 | a1 | b1 | b1 | b1 | a1 | a1 | a1 | a1 | a1 | b1 | b1 | a1 | a1 | b1 | a1 |
| 2 | b2 | a2 | b2 | a2 | a2 | b2 | a2 | b2 | b2 | b2 | b2 | b2 | b2 | a2 | b2 | b2 | b2 | a2 | a2 | a2 | a2 | a2 | b2 | b2 | a2 | a2 | b2 |
| 3 | b3 | a3 | a3 | b3 | a3 | a3 | b3 | a3 | a3 | a3 | b3 | b3 | b3 | b3 | a3 | b3 | b3 | b3 | a3 | a3 | a3 | a3 | a3 | b3 | b3 | a3 | a3 |
| 4 | a4 | b4 | b4 | a4 | b4 | a4 | a4 | b4 | a4 | b4 | a4 | b4 | b4 | b4 | b4 | a4 | b4 | b4 | b4 | a4 | a4 | a4 | a4 | a4 | b4 | b4 | a4 |
| 5 | a5 | a5 | b5 | a5 | a5 | b5 | a5 | a5 | b5 | a5 | b5 | a5 | b5 | b5 | b5 | b5 | a5 | b5 | b5 | b5 | a5 | a5 | a5 | a5 | a5 | b5 | b5 |
| 6 |  |  |  |  |  |  |  |  |  |  |  |  |  |  |  |  |  | a6 |  |  |  |  |  |  |  |  |  |
| 7 |  |  |  |  |  |  |  |  |  |  |  |  |  |  |  |  |  | b7 |  |  |  |  |  |  |  |  |  |
| 8 |  |  |  |  |  |  |  |  |  |  |  |  |  |  |  |  |  | b8 |  |  |  |  |  |  |  |  |  |
| 9 |  |  |  |  |  |  |  |  |  |  |  |  |  |  |  |  |  | b9 |  |  |  |  |  |  |  |  |  |
| 10 |  |  |  |  |  |  |  |  |  |  |  |  |  |  |  |  |  | b10 |  |  |  |  |  |  |  |  |  |
| 11 |  |  |  |  |  |  |  |  |  |  |  |  |  |  |  |  |  | a11 |  |  |  |  |  |  |  |  |  |
| 12 |  |  |  |  |  |  |  |  |  |  |  |  |  |  |  |  |  | b12 |  |  |  |  |  |  |  |  |  |
| 13 |  |  |  |  |  |  |  |  |  |  |  |  |  |  |  |  |  | a13 |  |  |  |  |  |  |  |  |  |
| 14 |  |  |  |  |  |  |  |  |  |  |  |  |  |  |  |  |  | b14 |  |  |  |  |  |  |  |  |  |
| 15 |  |  |  |  |  |  |  |  |  |  |  |  |  |  |  |  |  | a15 |  |  |  |  |  |  |  |  |  |
| 16 |  |  |  |  |  |  |  |  |  |  |  |  |  |  |  |  |  | b16 |  |  |  |  |  |  |  |  |  |
| 17 |  |  |  |  |  |  |  |  |  |  |  |  |  |  |  |  |  | b17 |  |  |  |  |  |  |  |  |  |
| 18 |  |  |  |  |  |  |  |  |  |  |  |  |  |  |  |  |  | a18 |  |  |  |  |  |  |  |  |  |
| 19 | b19 | b19 | b19 | a19 | b19 | b19 | b19 | a19 | a19 | a19 | a19 | a19 | b19 | b19 | b19 | a19 | b19 | a19 | a19 | b19 | a19 | a19 | b19 | a19 | b19 | a19 | b19 |
| 20 |  |  |  |  |  |  |  |  |  |  |  |  |  |  |  |  |  | a20 |  |  |  |  |  |  |  |  |  |
| 21 |  |  |  |  |  |  |  |  |  |  |  |  |  |  |  |  |  | a21 |  |  |  |  |  |  |  |  |  |
| 22 |  |  |  |  |  |  |  |  |  |  |  |  |  |  |  |  |  | a22 |  |  |  |  |  |  |  |  |  |
| 23 |  |  |  |  |  |  |  |  |  |  |  |  |  |  |  |  |  | b23 |  |  |  |  |  |  |  |  |  |
| 24 |  |  |  |  |  |  |  |  |  |  |  |  |  |  |  |  |  | b24 |  |  |  |  |  |  |  |  |  |
| 25 | a25 | b25 | a25 | b25 | a25 | a25 | b25 | b25 | b25 | a25 | b25 | b25 | b25 | a25 | a25 | a25 | a25 | a25 | b25 | b25 | a25 | a25 | b25 | a25 | a25 | b25 | a25 |
| 26 | a26 | a26 | b26 | b26 | b26 | b26 | b26 | b26 | b26 | b26 | a26 | a26 | b26 | b26 | b26 | a26 | a26 | a26 | a26 | b26 | b26 | a26 | a26 | b26 | a26 | a26 | b26 |
| 27 | b27 | a27 | a27 | b27 | a27 | b27 | a27 | a27 | b27 | b27 | b27 | a27 | b27 | b27 | b27 | b27 | a27 | a27 | a27 | a27 | b27 | b27 | a27 | a27 | b27 | b27 | a27 |

Figure 6

Super-slice Interleaving Sequence 1

Super-slice Interleaving Sequence 2

| disk | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| sequential | 26 | 19 | 11 | 4 | 4 | 11 | 19 | 26 | 33 | 41 | 48 | 56 | 63 | 70 | 78 | 85 | 89 | | 89 | 85 | 78 | 70 | 63 | 56 | 48 | 41 | 33 |
| good interlv | 48 | 52 | 52 | 48 | 48 | 52 | 52 | 48 | 41 | 37 | 56 | 44 | 52 | 48 | 52 | 48 | 44 | | 44 | 48 | 52 | 48 | 52 | 44 | 56 | 37 | 41 |
| best interlv | 48 | 52 | 44 | 48 | 48 | 44 | 52 | 48 | 48 | 48 | 52 | 48 | 48 | 44 | 48 | 44 | 48 | | 48 | 44 | 48 | 48 | 48 | 52 | 48 | 48 | 48 |

Figure 8

INTERLEAVING RAID SLICES ALLOCATION FOR FAST REBUILD

TECHNICAL FIELD

The subject matter of this disclosure is generally related to electronic data storage.

BACKGROUND

Redundant Array of Independent Drives (RAID) helps to avoid data loss in electronic data storage systems by enabling reconstruction of a failed member using the remaining members. A RAID-L (D+P) has D data members and P parity members that define a width $W=(D+P)$ for RAID level L. For example, RAID-5 (12+1) is characterized by $D=12$, $P=1$, and $W=13$. The data members store data. The parity members store parity information such as XORs of the data values. The parity information enables reconstruction of the data in the event that a data member fails. The data members enable reconstruction of the parity information in the event that a parity member fails. Each member of a RAID slice is a track of a different physical disk drive that enables reconstruction after a track of the slice becomes unavailable due to drive failure. The time required to rebuild RAID slice tracks tends to increase as disk storage capacity increases as a result of technical innovations. Rebuild times can be further elongated by high and unbalanced per-disk read/write loads associated with rebuilding lost slice tracks.

SUMMARY

A method in accordance with some implementations comprises creating data protection super-slices with super-parity, each of the super-slices created from a plurality of Redundant Array of Independent Disks (RAID) slices of width W that each include slice parity; and distributing each super-slice across 2W+1 disks of a disk cluster.

An apparatus in accordance with some implementations comprises a plurality of non-volatile drives; a plurality of interconnected compute nodes that manage access to the drives; and a Redundant Array of Independent Disks (RAID) controller configured to: create data protection super-slices with super-parity, each of the super-slices created from a plurality of RAID slices of width W that each include slice parity; and distribute each super-slice across 2W+1 disks of a disk cluster.

In accordance with some implementations, a computer-readable storage medium stores instructions that when executed by a computer cause the computer to perform a method comprising creating data protection super-slices with super-parity, each of the super-slices created from a plurality of Redundant Array of Independent Disks (RAID) slices of width W that each include slice parity; and distributing each super-slice across 2W+1 disks of a disk cluster.

This summary is not intended to limit the scope of the claims or the disclosure. Other aspects, features, and implementations will become apparent in view of the detailed description and figures. Moreover, all the examples, aspects, implementations, and features can be combined in any technically possible way.

BRIEF DESCRIPTION OF THE FIGURES

FIG. 4 illustrates the distribution of tracks of multiple super-slices in a disk cluster.

FIG. 5 illustrates read loading during rebuild for the disk cluster of FIG. 4 as compared with super-slices with interleaved tracks.

FIG. 6 illustrates interleaved distribution of tracks in super-slices in a disk cluster.

FIG. 8 illustrates read loading during rebuild for an optimized interleaving sequence versus a good interleaving sequence.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines, including, but not limited to, compute nodes, computers, computing nodes, and servers, and processes are therefore enabled and within the scope of the disclosure.

Figure 1:
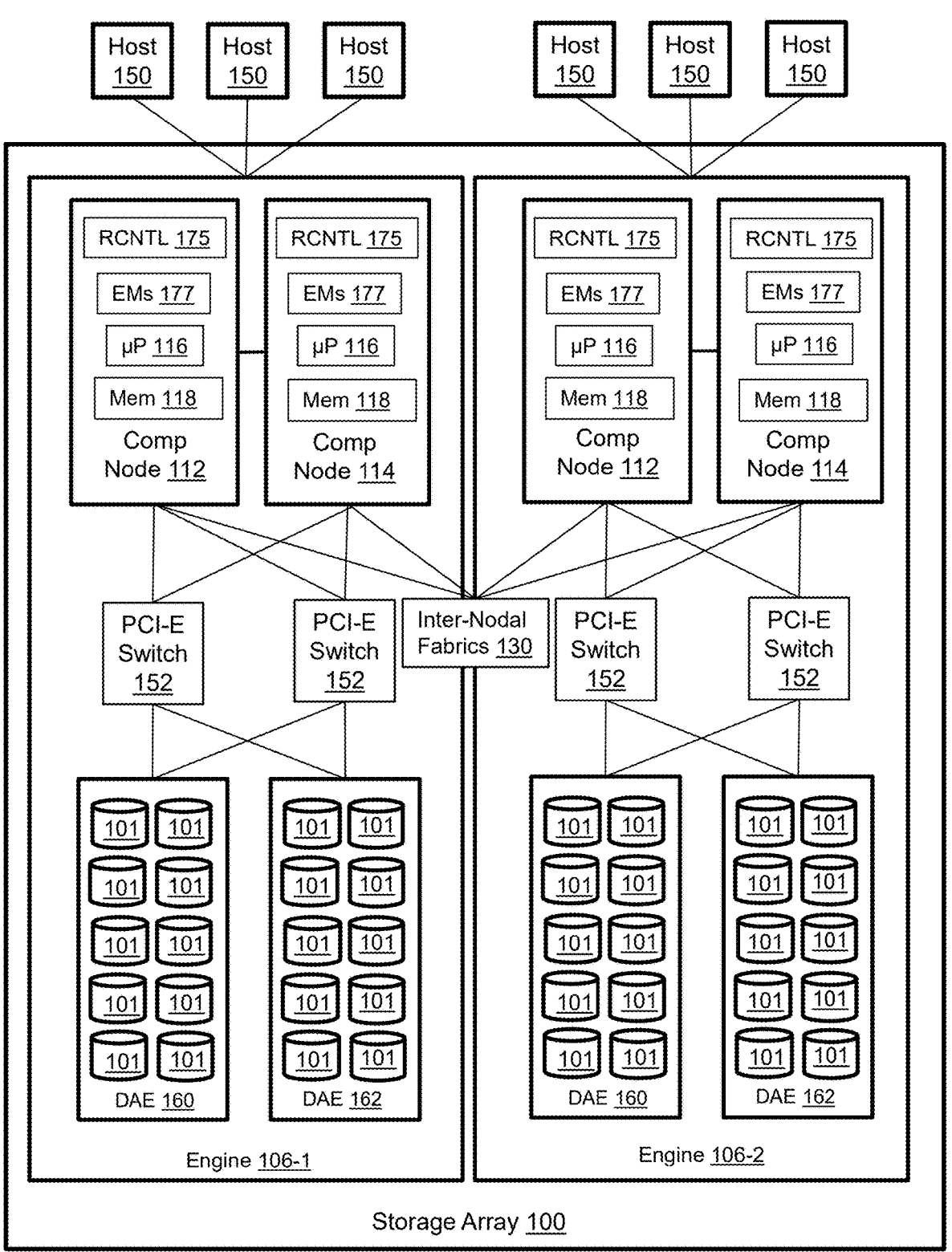
FIG. 1 illustrates a storage array with RAID controllers that are configured to organize RAID slices in a manner that helps to minimize rebuild time.

FIG. 1 illustrates a storage array 100 with RAID controllers 175 that are configured to organize RAID slices in a manner that helps to minimize rebuild time as will be described below in detail. The illustrated storage array includes two engines 106-1, 106-2, but might include any number of engines. Each engine includes disk array enclosures (DAEs) 160, 162 and a pair of peripheral component interconnect express (PCI-e) interconnected compute nodes 112, 114 (also known as storage directors) in a failover relationship. Within each engine, the compute nodes and DAEs are interconnected via redundant PCI-e switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing IOs from the host servers. Each compute node also includes one or more adapters for communicating with other compute nodes via redundant inter-nodal channel-based InfiniBand fabrics 130.

Each compute node 112, 114 runs emulations (EMs 177) for performing different storage-related tasks and functions. Front-end emulations handle communications with the host servers 150. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation. RAID controllers 175 may include one or more of: special purpose electronic components, logic, and computer program code loaded into memory 118 from the managed drives 101 and run on the processors 116.

Figure 2:
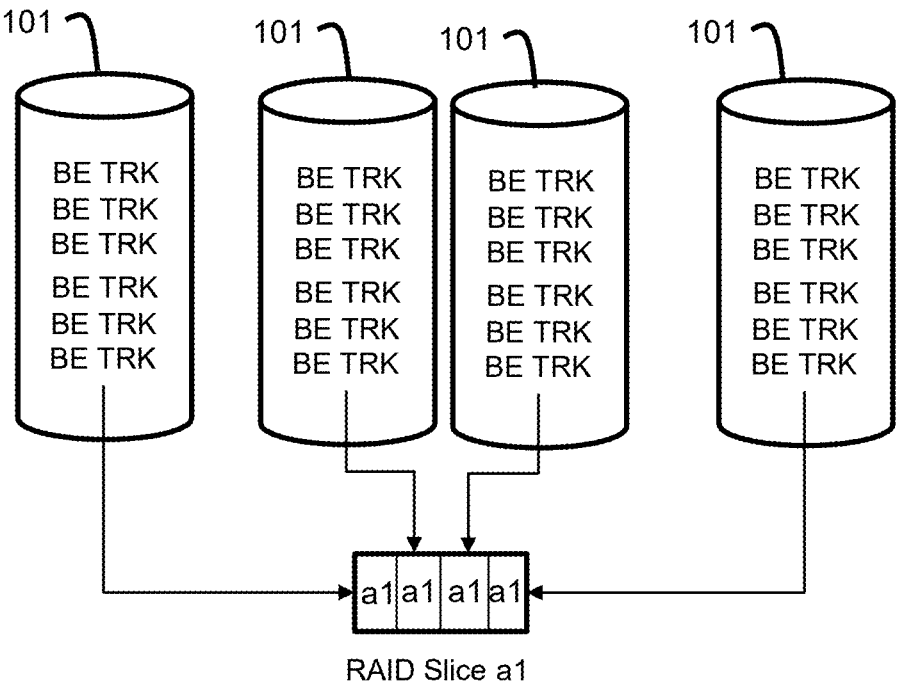
FIG. 2 illustrates layers of abstraction between the managed drives and the production storage object of the storage array of FIG. 1.
Figure 2:
Figure 2:
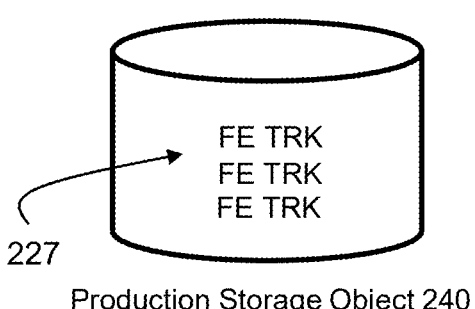

Referring to FIGS. 1 and 2, data that is created and used by instances of the host applications running on the host servers 150 is maintained on the managed drives 101. The managed drives are not discoverable by the host servers 150, so the storage array creates logical production storage objects such as production storage object 240 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers 150, each production storage object is a single disk drive having a set of contiguous fixed-size logical block addresses (LBAs) on which data used by the instances of one of the host applications resides. However, the host application data is stored at non-contiguous addresses on each of multiple ones of the managed drives 101. IO services emulations running on the processors of the compute nodes maintain metadata that maps between the LBAs of the production volume 240 and physical addresses on the managed drives 101 in order to process IOs from the host servers. Each production storage object is uniquely associated with a single host application. The storage array may maintain a plurality of production storage objects and simultaneously support multiple host applications.

The basic allocation unit of storage capacity that is used by the compute nodes 112, 114 to access the managed drives is a back-end track (BE TRK or simply "track"). Tracks from different managed drives are used to create a RAID slice a1 in which each track is referenced as a1. In order to be RAID-compliant, each track of a given slice must be on a different managed drive. In the illustrated example, each track of slice "a1" is stored on a different particular managed drive 101. Other slices, e.g., a2, b1, b2, c1, c2, d1, d2, and so forth, would be similarly formed. Storage resource pool 205 is a type of storage object that includes a collection of slices of the same RAID level. The host application data is logically stored in front-end tracks (FE TRKs) on production volume 240. The FE TRKs of the production volume are mapped to the BE TRKs on the managed drives and vice versa by tables and pointers that are maintained in the shared memory.

Figure 3:
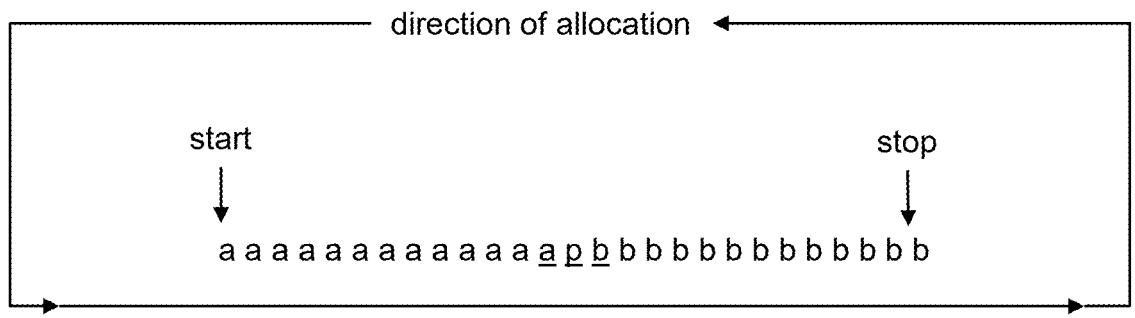
FIG. 3 illustrates a super-slice characterized by slice track adjacency.
Figure 3:
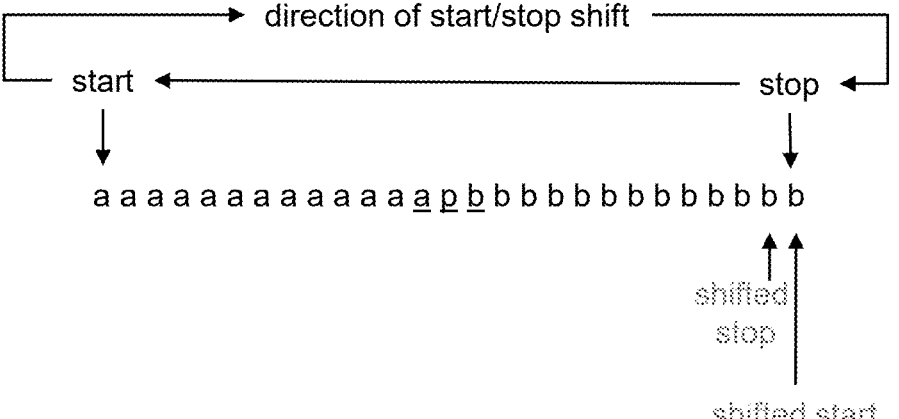

FIG. 3 illustrates a super-slice characterized by slice track adjacency. A super-slice includes multiple RAID slices and a super-parity distributed on 2W+1 disks. The illustrated super-slice includes two RAID-5 (12+1) slices a, b and a super-parity "p." The parity track of the "a" group is shown as "a" and the parity track of the "b" group is shown as "b." The super-slice is distributed across 27 disks, with each track of the super-slice located on a different disk. The super-parity $\underline{p}$ is calculated with erasure coding using all tracks of both slices (a, b) in the calculations. The super-parity enables either one of the slices to recover from the loss of two tracks rather than the usual one track. "Slice track adjacency" means that all "a" tracks are distributed in sequence and all "b" tracks are distributed in sequence. The sequence is fixed and wraps, so it is conceptually circular. In other words, the most distant tracks a and b in the illustrated linear representation are actually adjacent. The super-parity $\underline{p}$ is located between the "a" tracks and the "b" tracks in the illustrated example (specifically, between $\underline{a}$ and $\underline{b}$). The direction of allocation of the tracks on the disks is performed according to the illustrated pattern, from a start pointer to a stop pointer. In the illustrated example, the direction of allocation is shown as left-to-right but could be right-to-left with swapped start and stop pointers. As will be discussed below, the start pointer and stop pointer are both shifted by one place in the sequence for each successive super-slice in a distribution of multiple super-slices in a disk cluster. Single place shifted start and stop pointers are shown in the figure. The shift may be in either direction, provided the direction of shift is not changed.

Figure 4:
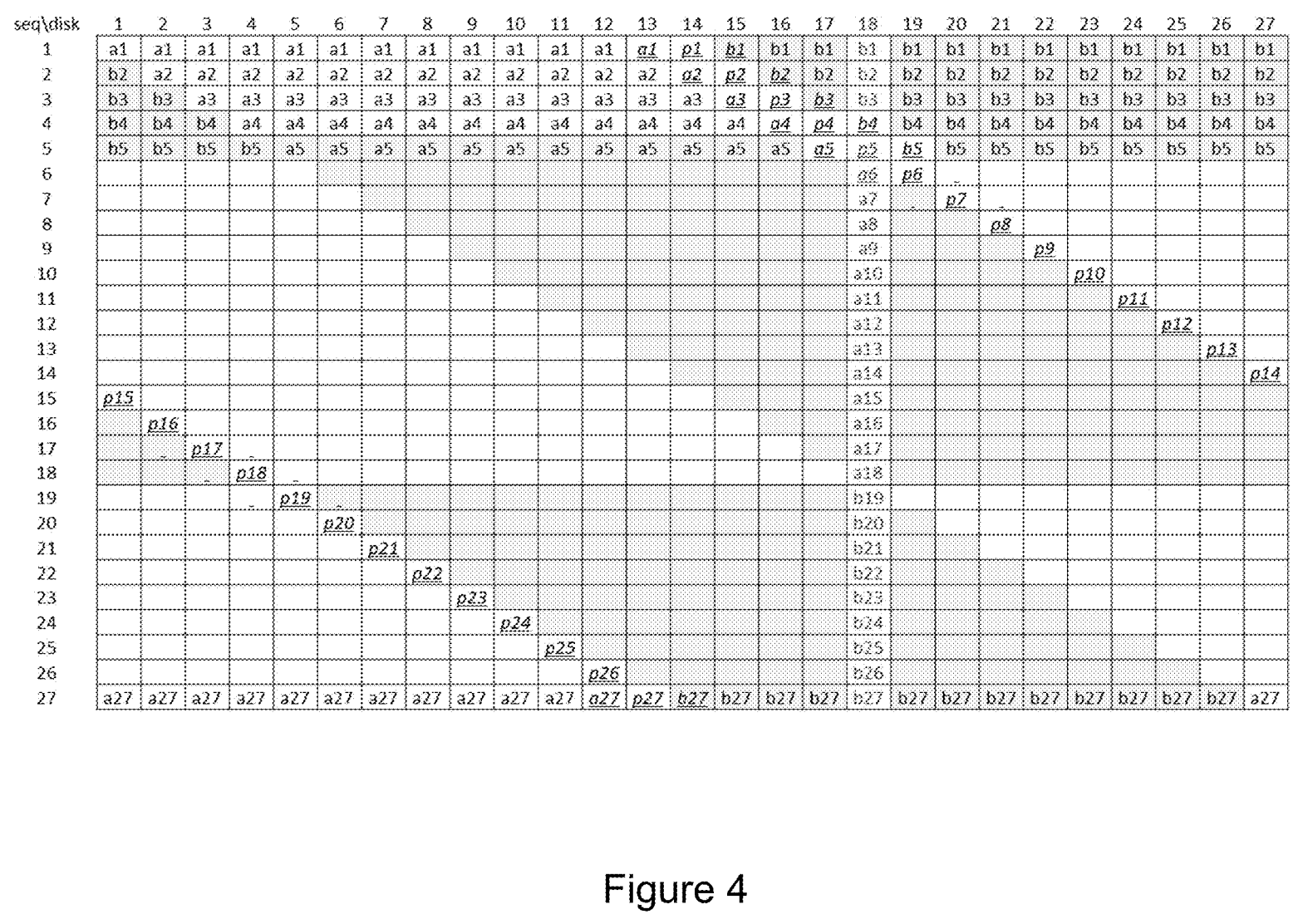

FIG. 4 illustrates the distribution of tracks of multiple super-slices in a disk cluster. Each super-slice includes two RAID-5 (12+1) slices an, bn and a super-parity $\underline{pn}$ distributed on 27 sequentially indexed disks. The start pointer of the first super-slice causes a1 tracks and associated parity $\underline{a1}$ to be placed on disks 1 through 13, super-parity $\underline{p1}$ on disk 14, and b1 tracks and associated parity $\underline{b1}$ to be placed on disks 15 through 27 of sequence 1. Shifting of the start and stop pointers causes a2 tracks and associated parity a2 to be placed on disks 2 through 14, super-parity $\underline{p2}$ on disk 15, and b2 tracks and associated parity $\underline{b2}$ to be placed on disks 16 through 27 and 1 (because of wrapping) of sequence 2. The next shift of the start and stop pointers causes a3 tracks and associated parity $\underline{a3}$ to be placed on disks 3 through 15, super-parity p3 on disk 16, and b3 tracks and associated parity b3 to be placed on disks 17 through 27 and 1 through 2 (because of wrapping) of sequence 3. The start and stop pointers are shifted for each sequence. There are 27 sequences and super-slices in total, but not all tracks of all super-slices are shown. Only 12 tracks need to be read to rebuild a super-slice affected by a disk failure, excepting that 24 tracks are read if the super-parity is on the failed disk. The shaded locations indicate reads required to recover from failure of disk 18.

FIG. 5 illustrates read loading during rebuild for the disk cluster of FIG. 4 as compared with interleaved tracks. As shown in FIGS. 4 and 5, slice track adjacency is associated with uneven read loads ranging from 4-89% per disk. Although performance is still better than a 13-disk wide cluster of RAID-5 (12+1) in which all tracks on 12 disks will be read in a rebuild following disk failure, interleaving the tracks of different slices within each super-slice can be used to help balance the read loads during rebuild (e.g., ranging from 37-56% per disk), thereby reducing rebuild time which is a function of the time required for reads to the disk that is read the most.

FIG. 6 illustrates interleaved distribution of tracks in super-slices in a disk cluster. All of the super-slices are characterized by a common interleaving sequence with start and stop pointers shifted by one place for each successive sequence and super-slice as explained above with reference to the super-slices characterized by slice track adjacency. The shaded locations indicate reads required to recover from failure of disk 18. Read load balance is improved relative to super-slices characterized by slice track adjacency. It has been found that different interleaving sequences are associated with different read load balances.

Figure 7:
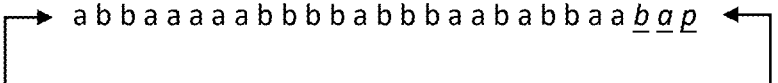
FIG. 7 illustrates two optimized super-slice track interleaving sequences.
Figure 7:
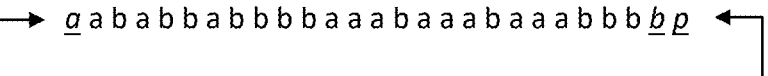

FIG. 7 illustrates two optimized super-slice track interleaving sequences for RAID-5 (12+1). Sequence 1 is shown (linearly) as (a b b a a a a a b b b b a b b b a a b a b b a a b a p). However, the sequence is actually circular so the leading "a" and trailing "p" are conceptually adjacent. Sequence 2 is shown (linearly) as (a a b a b b a b b b b a a a b a a a b a a a b b b b b p). However, the sequence is actually circular so the leading "a" and trailing "p" are conceptually adjacent. These two optimized super-slice track interleaving sequences have been found to result in the most balanced per-disk read loading for super-slices built from two RAID-5 (12+1) slices using the following criteria: minimal highest read % among all disks; lowest count of disks at the highest level of read %; lowest count of disks at the next highest level of read %; and more counts at the next levels, if needed for tie breaking.

FIG. 8 illustrates read loading during rebuild for an optimized interleaving sequence versus a good interleaving sequence. As previously shown, slice track adjacency leads to 10 disks at higher rebuild read levels with 63-89% of all tracks per disk to be read. A good interleaving allocation from the previously shown example leads to more evenly distributed read loads with the highest level reduced from 89% to 56%. Optimized interleaving allocation with either of the two optimized sequences leads to the most balanced read loads with the highest level minimized to 52%.

Figure 9:
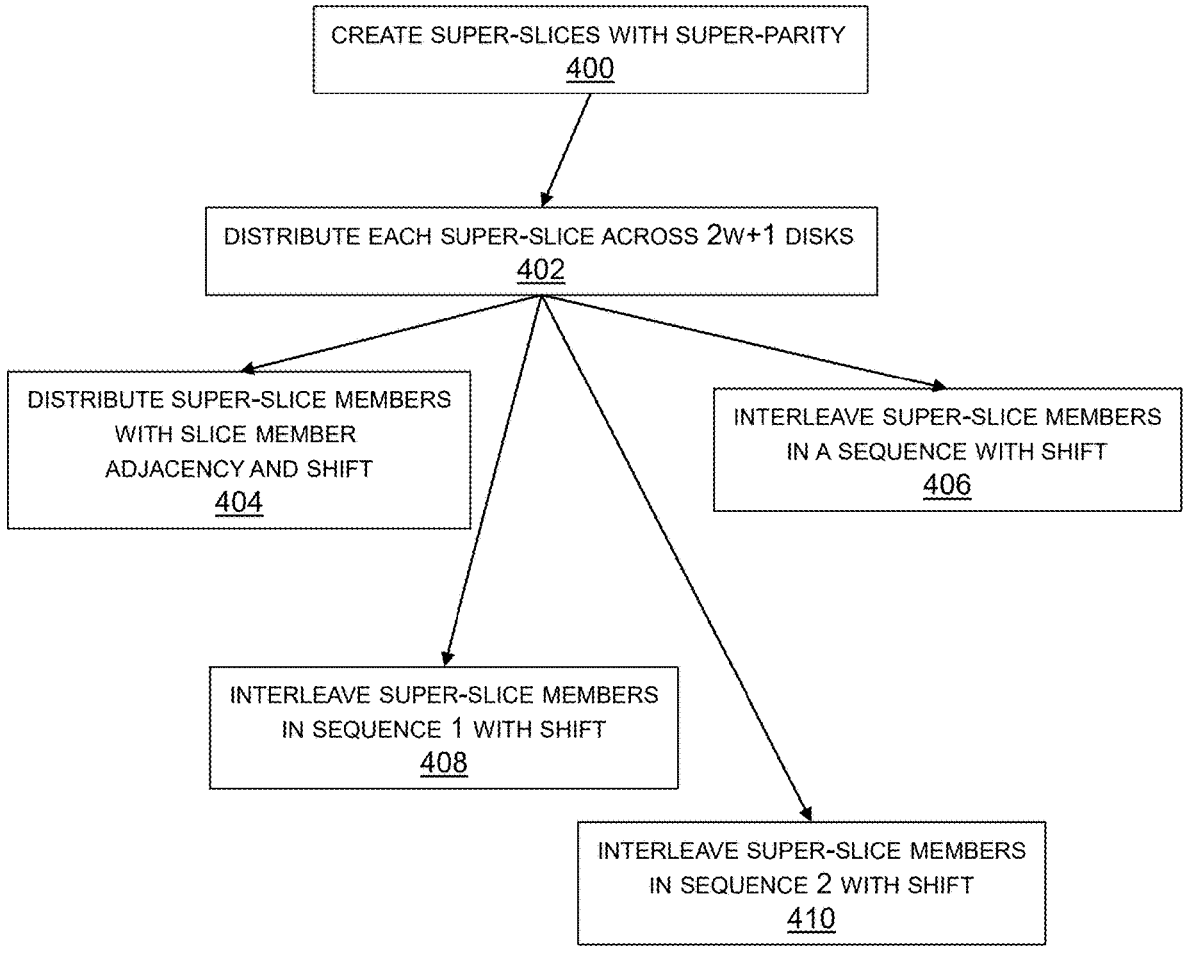
FIG. 9 illustrates a method for organizing RAID slices to facilitate rebuild.

FIG. 9 illustrates a method for organizing RAID slices to facilitate rebuild. The method may be implemented, in whole or in part, by the RAID controllers. Step 400 is creating super-slices with super-parity. This includes calculating a super-parity from a plurality of RAID slices that each include slice parity, e.g., two RAID-5 (12+1) slices. Step 402 is distributing each super-slice across 2W+1 disks of a disk cluster. This may include creating a disk cluster with a width of 2W+1 disks with 2W+1 sequences, each containing one super-slice. The tracks of each super-slice can be distributed in sequences in at least four different ways, but the same technique is used throughout the disk cluster. The first distribution technique is distributing super-slice tracks with slice track adjacency and start and stop pointer shift as shown in step 404. "Slice track adjacency" means that all "a" tracks are distributed in sequence and all "b" tracks are distributed in sequence. The sequence wraps, so it is conceptually circular. The super-parity may be located between the "a" tracks and the "b" tracks, e.g., between slice parity a and slice parity b. The start and stop pointers are shifted by one place for each successive sequence/super-slice. The second distribution technique is distributing super-slice tracks with the tracks of different slices interleaved in a fixed sequence with start and stop pointer shift as shown in step 406. The sequence may be any sequence that is not characterized by slice track adjacency. The third distribution technique is distributing super-slice tracks with the tracks of different slices interleaved in sequence 1 (described above) with start and stop pointer shift as shown in step 408. Sequence 1 is conceptually circular but can be expressed linearly as (a b b a a a a a b b b b a b b b a a b a b b a a b a p). The fourth distribution technique is distributing super-slice tracks with the tracks of different slices interleaved in sequence 2 (described above) with start and stop pointer shift as shown in step 410. Sequence 2 is conceptually circular but can be expressed linearly as (a a b a b b a b b b b a a a b a a a b a a a b b b b b p).

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims. For example, and without limitation, the concepts disclosed herein may be applied to Erasure Coding with D data tracks and P parity members, where the group size W=D+P.

What is claimed is:

1. A method, comprising:
   creating data protection super-slices with super-parity, each of the super-slices created from a plurality of Redundant Array of Independent Disks (RAID) slices of width W that each include slice parity; and
   distributing each super-slice across 2W+1 disks of a disk cluster.

2. The method of claim 1 further comprising creating the disk cluster with a width of 2W+1 disks with 2W+1 indexed sequences, each of the indexed sequences containing one super-slice with tracks of two slices a, b distributed in order from a start pointer to a stop pointer.

3. The method of claim 2 further comprising shifting the start pointer and the stop pointer for each successive indexed sequence.

4. The method of claim 3 further comprising distributing the tracks of each super-slice with slice track adjacency.

5. The method of claim 3 further comprising interleaving the tracks of each super-slice in a fixed sequence.

6. The method of claim 3 further comprising interleaving the tracks of each super-slice in a fixed sequence (a b b a a a a a b b b b a b b b a a b a b b a a b a p), where a is the slice a parity, b is the slice b parity, and p is the super-parity.

7. The method of claim 3 further comprising interleaving the tracks of each super-slice in a fixed sequence (a̲ a b a b b a b b b b a a a b a a a b a a a b b b b̲ p̲), where a̲ is the slice a parity, b̲ is the slice b parity, and p̲ is the super-parity.

8. An apparatus, comprising:
    a plurality of non-volatile drives;
    a plurality of interconnected compute nodes that manage access to the drives; and
    a Redundant Array of Independent Disks (RAID) controller configured to:
        create data protection super-slices with super-parity, each of the super-slices created from a plurality of RAID slices of width W that each include slice parity; and
        distribute each super-slice across 2W+1 disks of a disk cluster.

9. The apparatus of claim 8 further comprising the RAID controller configured to create the disk cluster with a width of 2W+1 disks with 2W+1 indexed sequences, each of the indexed sequences containing one super-slice with tracks of two slices a, b distributed in order from a start pointer to a stop pointer.

10. The apparatus of claim 9 further comprising the RAID controller configured to shift the start pointer and the stop pointer for each successive indexed sequence.

11. The apparatus of claim 10 further comprising the RAID controller configured to distribute the tracks of each super-slice with slice track adjacency.

12. The apparatus of claim 10 further comprising the RAID controller configured to interleave the tracks of each super-slice in a fixed sequence.

13. The apparatus of claim 10 further comprising the RAID controller configured to interleave the tracks of each super-slice in a fixed sequence (a b b a a a a a b b b b a b b b b a a b a b b a a b̲ a̲ p̲), where a̲ is the slice a parity, b̲ is the slice b parity, and p̲ is the super-parity.

14. The apparatus of claim 10 further comprising the RAID controller configured to interleave the tracks of each super-slice in a fixed sequence (a̲ a b a b b a b b b b a a a b a a a b a a a b b b b̲ p̲), where a̲ is the slice a parity, b̲ is the slice b parity, and p̲ is the super-parity.

15. A non-transitory computer-readable storage medium storing instructions that when executed by a computer cause the computer to perform a method comprising:
    creating data protection super-slices with super-parity, each of the super-slices created from a plurality of Redundant Array of Independent Disks (RAID) slices of width W that each include slice parity; and
    distributing each super-slice across 2W+1 disks of a disk cluster.

16. The non-transitory computer-readable storage medium of claim 15 in which the method further comprises creating the disk cluster with a width of 2W+1 disks with 2W+1 indexed sequences, each of the indexed sequences containing one super-slice with tracks of two slices a, b distributed in order from a start pointer to a stop pointer and shifting the start pointer and the stop pointer for each successive indexed sequence.

17. The non-transitory computer-readable storage medium of claim 16 in which the method further comprises distributing the tracks of each super-slice with slice track adjacency.

18. The non-transitory computer-readable storage medium of claim 16 in which the method further comprises interleaving the tracks of each super-slice in a fixed sequence.

19. The non-transitory computer-readable storage medium of claim 16 in which the method further comprises interleaving the tracks of each super-slice in a fixed sequence (a b b a a a a a b b b b a b b b b a a b a b b a a b̲ a̲ p̲), where a̲ is the slice a parity, b̲ is the slice b parity, and p̲ is the super-parity.

20. The non-transitory computer-readable storage medium of claim 16 in which the method further comprises interleaving the tracks of each super-slice in a fixed sequence (a̲ a b a b b a b b b b a a a b a a a b a a a b b b b̲ p̲), where a̲ is the slice a parity, b̲ is the slice b parity, and p̲ is the super-parity.

\* \* \* \* \*